United States Patent [19]

Jahnig

[11] 4,197,700
[45] Apr. 15, 1980

[54] GAS TURBINE POWER SYSTEM WITH FUEL INJECTION AND COMBUSTION CATALYST

[76] Inventor: Charles E. Jahnig, 5 Auldwood La., Rumson, N.J. 07760

[21] Appl. No.: 732,051

[22] Filed: Oct. 13, 1976

[51] Int. Cl.² .................... F02M 27/02; F02C 3/16
[52] U.S. Cl. .................... 60/39.04; 60/39.06; 60/39.17; 60/723; 60/735
[58] Field of Search .......... 60/39.02, 39.06, 39.69 A, 60/39.17, 39.82 C, 39.04

[56] References Cited

U.S. PATENT DOCUMENTS

| 2,243,467 | 5/1941 | Jendrassik | 60/39.04 |
|---|---|---|---|
| 2,305,785 | 12/1942 | Jendrassik | 60/39.04 |
| 2,407,166 | 9/1946 | Kreitner et al. | 60/39.04 |
| 2,656,677 | 10/1953 | Peterson | 60/39.17 |
| 3,928,961 | 12/1975 | Pfefferle | 60/39.02 |

FOREIGN PATENT DOCUMENTS

288547 9/1953 Switzerland .................... 60/39.17

Primary Examiner—Leonard E. Smith
Attorney, Agent, or Firm—Edward J. Brenner

[57] ABSTRACT

An expansion turbine is used to develop power, wherein combustion of fuel is carried out within the turbine. Increments of fuel are added to two or more points in the presence of a catalyst whereby temperature of the gas or equipment is controlled at substantially isothermal conditions.

13 Claims, 5 Drawing Figures

GAS TURBINE POWER SYSTEM WITH FUEL INJECTION AND COMBUSTION CATALYST

BACKGROUND OF THE INVENTION

1. Field of the Invention

The present invention relates to gas turbines and more particularly to gas turbines in which combustion is carried out therein.

2. Description of the Prior Art

At present, conventional gas turbines are used for generation of electric power since the equipment is simple, low cost, and can be started up quickly. However, fuel efficiency has been low—about 25% versus 35% for alternatives using steam systems—and with the current high price of fuel, gas turbines have not found application except for short time use at peak load where efficiency is not an overriding factor. Turbines also require a reasonably clean fuel, which is no longer available at low cost in the form of natural gas. Even so, gas turbines are used extensively to fill the demand for electric power during periods of peak demand, as for several hours during the evening. If efficiency could be improved significantly, turbines would become attractive for "base load" operation—that is, for continuous operation.

Turbine efficiency can be increased by raising the maximum operating temperature, although equipment costs increase sharply due to the need for special materials of construction. At present, inlet temperatures of 2000° to 2200° F. on gas turbines are used, and allowable temperature is expected to increase in the future, to perhaps 3000° F. within the next decade or two. Conventionally, hot gas is supplied to the turbine from a precombustor burning a fuel with air to supply hot gas to the turbine at maximum allowable temperature, as limited by mechanical construction. This combustor is at elevated pressure and normally uses a clean gas or liquid fuel. Gas temperature and pressure both decrease considerably during expansion through the turbine, depending mainly on the ratio of inlet to outlet pressure, such that the outlet gas may be at perhaps 1000° F., for example. Its residual heat content is then recovered by heat exchange, typically by exchange with the cool compressed gas or air going to the combustor. This heat exchanger is commonly called a recuperator, and can increase the efficiency of a turbine system considerably; however, its range of application is limited by the practical economic design temperature at which it can operate, for example, 1000° to 1200° F. maximum. As a result, efficiency for the usual turbine systems leaves considerable room for improvement.

Similarly, maximum turbine inlet temperatures have a practical mechanical limit today of about 2000° to 2200° F., and the potentially high efficiency that is theoretically possible has not been achieved. Great effort is directed at ways to allow higher operating temperature, as by cooling the blades using air or water, or by improved materials, and ceramic blades or coatings. Operating pressure could be increased within the range of current technology, but it has not allowed a marked increase in efficiency with present systems.

A variety of modifications to gas turbines have been proposed to increase work output. More particularly, U.S. Pat. Nos. 2,238,905 and 2,478,851 propose reheating of the gas between turbines. The latter patent also proposes the use of conventional external combustors between turbine stages to heat a portion of the gases between stages to high temperatures. However, such a process can bring in excessively hot gases onto the turbine blades and thereby cause mechanical problems.

SUMMARY OF THE INVENTION

The present invention involves a method and system for producing power in gas turbines wherein fuel is combusted directly in the gas turbine under substantially isothermal conditions. More particularly, the present invention achieves significantly higher fuel efficiency and other benefits in a gas turbine power system by firing fuel at multiple points or zones as the hot gas passes through an expansion turbine, so as to offset substantially all of the drop in temperature that would otherwise be associated with the expansion of the gas. Maximum pressure in the system will be increased compared to conventional systems, whereby more power will be provided from a given flow rate of gas, and without a large increase in the turbine diameter. In simplest terms, the new system consists of a "combustor-turbine" in which the gas expands over a pressure ratio of perhaps 2/1 to 20/1, while gas temperature is maintained roughly constant by burning fuel during the process of expansion, followed by a turbo-expansion step without addition or removal of heat to provide a cooled outlet gas. The latter gas then goes to a heat exchanger and it is at low enough temperature to permit using an exchanger of reasonable size and cost, using practical materials that are already available and have been used in such service.

The heat exchanger serves to cool the gas, while preheating an air or gas stream that has been pressurized. After preheating, the gas is next passed through a compression turbine where its pressure is raised to the required level. The gas temperature will also increase since no major amount of heat is removed during this compression step. The gas can then be further heated if desired, in a combustion zone before entering the aforementioned combustor-turbine.

Compared to other systems handling the same gas flow rate, the new system of the present invention is characterized by much higher efficiency, higher maximum operating pressure, higher fuel consumption and power output, without the need to increase the maximum operating temperature. Other characteristic advantages will become apparent, some of which will be discussed in the subsequent description.

A primary object of the present invention is thus to provide a gas turbine system that can generate power at much higher efficiency without requiring new and difficult developments in technology and the need for higher maximum temperatures in the turbine. A further object is to increase the net power output for a given gas flow rate.

The detailed description of the present invention taken in conjunction with following drawings will show how known areas of technology can be combined in new ways to give combinations having unusually high fuel efficiencies compared to alternative turbine systems, and in particular, with efficiencies better than the best modern steam power plants. Moreover, the simplicity and other desirable features of turbine systems are retained, with the result that they become applicable for base load operation as well as for peak load conditions.

DESCRIPTION OF THE PREFERRED EMBODIMENTS

Figure 1:
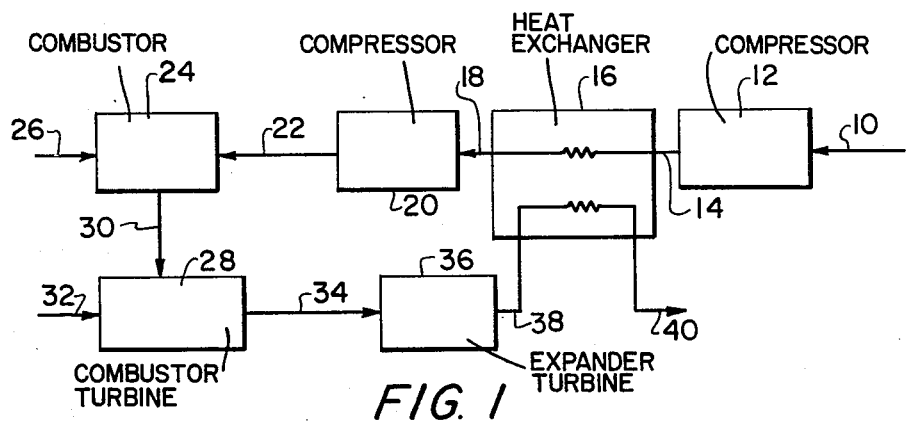
FIG. 1 is a schematic drawing of a preferred embodiment of the power system of the present invention.

To illustrate the combustor-turbine system, its operation will be described with reference to FIG. 1. This shows the component elements of the process, which are carried out in a series of steps. First the gas, which in the simplest application is ambient air, is introduced into the system through conduit 10 and compressed—preferably but not necessarily with some heat removal—in isothermal compressor 12. Such cooling by means of heat removal serves to increase process efficiency by decreasing the work required for compression, and can be conveniently carried out in a manner which will be described later. Ideally, the compression is isothermal, but conventional intercoolers can be used as a practical approach, and the cooling is a desirable but not essential part of the process.

From compression to about 10 atmospheres, the gas goes via conduit 14 to a heat exchanger 16 wherein it is heated by indirect exchange with hot gases leaving the power generation part of the process, before these gases are released to the atmosphere. Compressed gas enters at about 140° F. or at 80° F. with cooling and leaves the exchanger about 940° F. Pressure drop on the gas flowing is minor.

The preheated gas then flows via conduit 18 through a compressor 20 which serves to raise the pressure to a required level of about 62 atmospheres, but equally important, raises the gas temperature to 1900° F. to 2000° F. due to the work of compression. Thus, heat removal is not desired in this step, and any cooling is incidental as for mechanical design reasons.

Next, the gas goes via line 22 to a combustor 24 where it is heated by means of fuel introduced through conduit 26 to the maximum design temperature to be used in the power turbine, for example 2000° F. to 2200° F. As the gas then enters the expander-turbine 28 via conduit 30, it begins to expand, and cool at the same time, but such temperature drop is largely offset by additional combustion which results from additional fuel added to the turbine 28 through conduit 32. Thus, fuel gas or liquid can be injected into the combustor-turbine 28 through the casing or housing at multiple points, and in appropriate increments as will be described in greater detail hereinafter. Common fuels burn readily at the above turbine temperatures, and a relatively slow combustion is adequate, and in fact, often preferred for the design.

Gases leave the combustor-turbine 28 at lower pressure but still at very high temperature, such that it would be difficult to design an economical heat exchanger to handle them directly. Therefore, they are cooled by passing via conduit 34 and into and through an expander-turbine 36, which may be generally comparable to a conventional turbine. No major heating or cooling is carried out in this substantially adiabatic expansion step, but combustion of residual fuel may give some heat release, and the mechanical design may include cooling of equipment as by flowing cool air through the rotating blades. This expander 36 can have an inlet temperature of about 2000° F. for example, and an outlet of about 1000° F. The outlet pressure may be about one atmosphere.

Gas from the expander 36 flows via conduit 38 to the heat exchanger 16 previously mentioned, where it is cooled to recover heat which is transferred to the cool compressed air. A nominal temperature difference of 100° F. can provide the driving force for passing heat through the metal surface of the exchanger. Gases leave this exchanger via conduit 40 at about 240° F., for example, and at about atmospheric pressure, and hence can be released directly to the atmosphere, without further treatment if appropriate, or cleaned up if needed. They can also be partly or largely reused as by returning them to the inlet of the air compressor or other suitable point.

From this series of steps a net generation of useful power is obtained. The power available from the two expanders is much more than the power used by the two compressors.

To show the advantages of the invention more explicitly, a comparison will now be given using tabulations of characteristics. The first comparison is given in Table I below, which is based on the system described above, on an idealized basis that in effect assumes 100% turbine efficiency. The heat exchanger assumes about 100° F. approach on each end. For simplicity, the effects of fuel gas compression, expansion, and sensible heat have been omitted, but do not change the comparison significantly. For comparison, a conventional gas turbine system used for power generation would give about 35% efficiency.

TABLE I

| Work of compression: | |
|---|---|
| Isothermal | 2483 Btu/mol gas. |
| Adiabatic | 6730 |
| Total | 9213 |
| Work of expansion: | |
| Isothermal | 11320 |
| Adiabatic | 7020 |
| Total | 18340 |
| Net work output | 9127 |
| Heat Input, total | 12120 |
| Thermal efficiency: | |
| at 100% turbine efficiencies | 75.0 |
| at 90% turbine efficiencies | 61.8 |

It will be seen from Table I that the new system provides considerably higher fuel efficiency than conventional technology—over 50% higher. This is without increasing the maximum temperature. Operating pressure is increased but still well within capability of current technology. Additional turbine equipment is used but the increase in power output is comparable. The unusually high fuel efficiency is thus an outstanding advantage.

Operating at 2200° versus 2000° F. will give a modest improvement in efficiency, which is well worth obtaining. In these examples, the expander is designed to give an outlet temperature of 1000° F., which is a reasonable one for designing heat exchangers. A higher or lower temperature could be used and would still show a major advantage of the combustor-turbine. As shown on the last line of Table I, efficiencies are lower when allowing for realistic turbine efficiencies of 90%.

The adiabatic expander 36 and the companion hot compressor 20 are primarily temperature adjustment devices, and it is desirable to design the system so that their power quantities are approximately in balance so that the expander suppliers most or all of the power needed by the compressor. It is then advantageous to combine them on the same shaft.

Heat input can be supplied to the combustor-turbine 24 by various means, such as staged or stepwise additions of fuel through the casing or housing of the machine as will be described in greater detail hereafter. Part of the fuel can be added ahead of the turbine, via the stator blades, through channels in the rotor, etc. Adding fuel via the rotor assembly facilitates good distribution of fuel through the flowing gases. Moreover, when feeding liquid fuel the rotation provides a relative velocity to assist in good atomization. Water can be added to the fuel as an emulsion to further assist in atomization, using for example 3–10% water mixed with the liquid fuel.

In some cases, it will be desirable to facilitate combustion by preheating the fuel and by using a catalyst. Also, enlarged zones can be provided around the casing to serve as combustion zones. In general, a relatively slow combustion is desirable in order to maintain a more uniform temperature, although it should be reasonably completed before leaving the expansion turbines. As is known, air can be added through or along the rotating vanes or blades to provide cooling and temperature control.

It is also contemplated that the gas within the turbine 40 can be "fuel rich" by feeding a combustible gas to the turbine and then effecting controlled combustion by adding increments of air, rather than fuel gas. This is particularly advantageous when using low Btu gas, such as 200 Btu/scf or less. It is also contemplated that such gas can be supplied by an integral gasifier, where the working gas is passed through a zone where coal or other fuel is gasified to supply fuel for the turbine. Instead of running with a fuel-rich atmosphere, fuel gas from the integral gasifier can be added during the expansion as originally described.

Air can be used once-through in the system, or waste gas can be recycled to control gas composition in the turbines or in the gasifier. Makeup air can be added to the gasifier to supply heat.

A characteristic of the new system that is of interest for planes or transportation applications, is that the expansion turbines can be designed to provide a range of power outputs and fuel efficiencies as desired. Thus, for one operating mode fuel can be fired over an increased length of the combustor-turbine to greatly increase the power output without raising the maximum temperature. Then, for maximum efficiency, less fuel is fired, and only over the upstream part of the turbine, while the rest of the turbine serves as an adiabatic expander to maximize recovery of energy. Of course, the compressors and rest of the system must be designed to accommodate this type of operation.

One other aspect of this system will be discussed as it affects the method used for compression at low temperature. As is well known, the work of compression is less for isothermal than for adiabatic compression, and is less at lower temperature. A common technique is to use intercoolers between compression stages. A different method can be used to advantage to limit temperature increase with the new system. Briefly, this method uses the latent heat of water to take up the heat of compression, by carefully spraying in controlled increments of clean water during compression or between stages. The water can be sprayed within the turbine, through the casing, or via the rotor to assist atomization and distribution.

In many cases, the added water might be objectionable; however, in the present system it is an advantage in that it contributes to the quantity of gas flowing through the subsequent expanders, without a corresponding increase in the air rate to compression. The work of compression then generates more working fluid, rather than being rejected. When using integral gasification, the added water vapor is useful to react with the coal or other fuel being gasified.

The extent of cooling is related to the vapor pressure of water, but for the systems described, the temperature leaving the cool compressor can be limited to about 200°–300° F. The water can be sprayed into the compressor as a very fine mist and at many points so as not to damage the compressor. Or water can be sprayed in between stages of compression using segregated contacting zones so that liquid water does not enter the compressors. The water can be condensate, demineralized, or purified to control deposits.

Typical conditions for this new system are as given in Table I for the technology available today, which allows an economic maximum temperature of about 2000° to 2200° F. In the future, optimum temperatures will increase as capability in high temperature equipment and materials improves. For example, turbine temperatures of 3000° F. have been projected for the 1990's.

Figure 2:
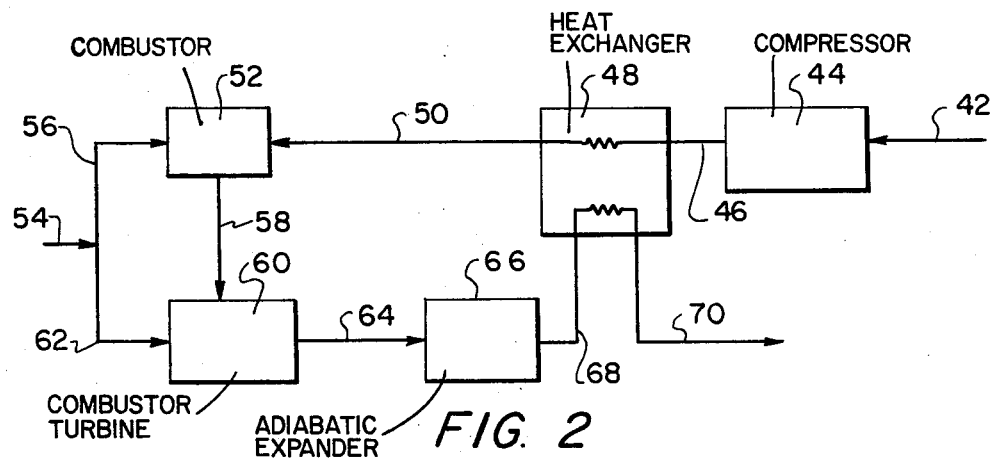
FIG. 2 is a schematic drawing of a further embodiment of the present invention representing a simplification of the power system shown in FIG. 1.

FIG. 2 shows a simplification of the power system of FIG. 1 in that only one compressor is used, followed by a heat exchanger. While theoretical efficiency is lower than for FIG. 1, the practical efficiency (allowing for turbine inefficiencies) is very high, as shown below in Case A of Table II, which will be described hereinafter in greater detail. As shown by the alternative Case B set forth in Table II, below, a temperature of 1600° F. in the isothermal expander also gives a very attractive efficiency.

TABLE II

|  | 4450 Btu/mol gas (4450) | |
|---|---|---|
|  | Case A | Case B* |
| Work of compression |  |  |
| Work of expansion, isothermal | 11,320 | 12,010 |
| adiabatic | 7,020 | 4,210 |
| Total | 18,340 | 16,220 |
| Net work output | 13,890 | 11,770 |
| Heat input, total | 20,120 | 17,610 |
| Thermal Efficiencies: |  |  |
| at 100% turbine efficiencies | 69.1 | 66.8 |
| at 90% turbine efficiencies | 63.1 | 61.7 |

*Numbers in Case B are for isothermal expansion at 1600° F. from 62 atm. to 3.36 atm., plus adiabatic expansion to 1 atm.

Now referring to FIG. 2, air is introduced via conduit 42 to isothermal compressor 44 wherein it is compressed to 62 atmospheres at 80° F. Thereafter the compressed air is passed through conduit 46 to indirect heat exchanger 48 wherein the air is heated to 900° F. by indirect heat exchange with the exhaust gas from the system.

The heated and compressed air is then passed through conduit 50 to combustor 52 where a fuel introduced through conduits 54 and 56 is combusted to raise the temperature of the gas to about 2000° F. The gas is then passed via conduit 58 to combustion turbine 60 and is expanded to 6.2 atmospheres under substantially isothermal conditions by combustion of fuel introduced through conduits 54 and 62. Thereafter the gas is passed via conduit 64 to adiabatic expander 66 and is expanded under adiabatic conditions to one atmosphere pressure and about 1000° F. The cooled exhaust gas is then passed via conduit 68 through indirect heat exchanger 48 and is further cooled by indirect heat exchange with the air entering the exchanger 48 through conduit 46. The exhaust gas then leaves the exchanger 48 through conduit 70.

Figure 3:
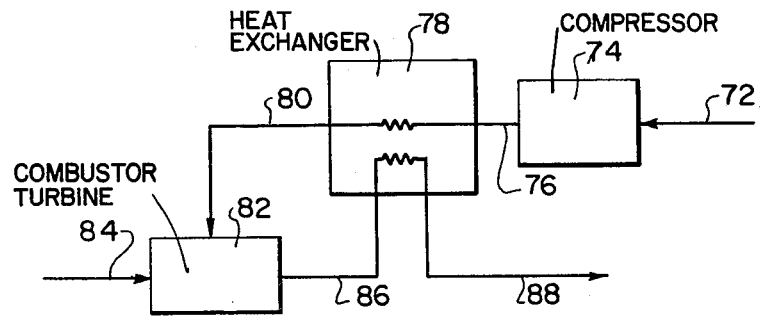
FIG. 3 is a schematic drawing of a still further embodiment of the present invention representing a simplification of the power system shown in FIG. 2.

FIG. 3 is a simplified system with only one compressor and one expander. While the efficiency is not as high as the previous cases, it is still very good, and the simplicity is attractive, as indicated in Case A in Table III below, which will be described hereinafter in greater detail. As shown by the alternative Case B in Table III below, 82 atmospheres pressure is not greatly different from the 62 atm. operation of Case A, but the power output per mol of gas is significantly greater.

TABLE III

|  | Case A | Case B* |
|---|---|---|
| Work of compression | 4450/Btu/mol. | 4740 |
| Work of expansion | 12031 | 12816 |
| Net Work | 7581 | 8076 |
| Heat input | 12831 | 13616 |
| Thermal Efficiency: |  |  |
| at 100% turbine efficiencies | 59.1 | 59.3 |
| at 90% turbine efficiencies | 51.6 | 50.8 |

*Numbers in Case are for going to 82 atm. maximum pressure versus 62.

Now referring to FIG. 3, air is introduced through conduit 72 to isothermal compressor 74 wherein the air is compressed at 80° F. to 62 atmospheres. The compressed air is then passed via conduit 76 to indirect heat exchanger 78 wherein the air is heated to about 900° F. by indirect heat exchange with the exhaust gases of the power system.

The heated and compressed gas is then passed through conduit 80 to combustor-turbine 82 where a fuel introduced through conduit 84 is burned and the gas is expanded to one atmosphere under isothermal conditions at about 1000° F. Thereafter the exhaust gas is passed via conduit 86 through indirect heat exchanger 78 and is cooled by indirect heat exchange with the air entering the exchanger 78 through conduit 76. The exhaust gas then leaves the exchanger 78 through conduit 88.

Figure 4:
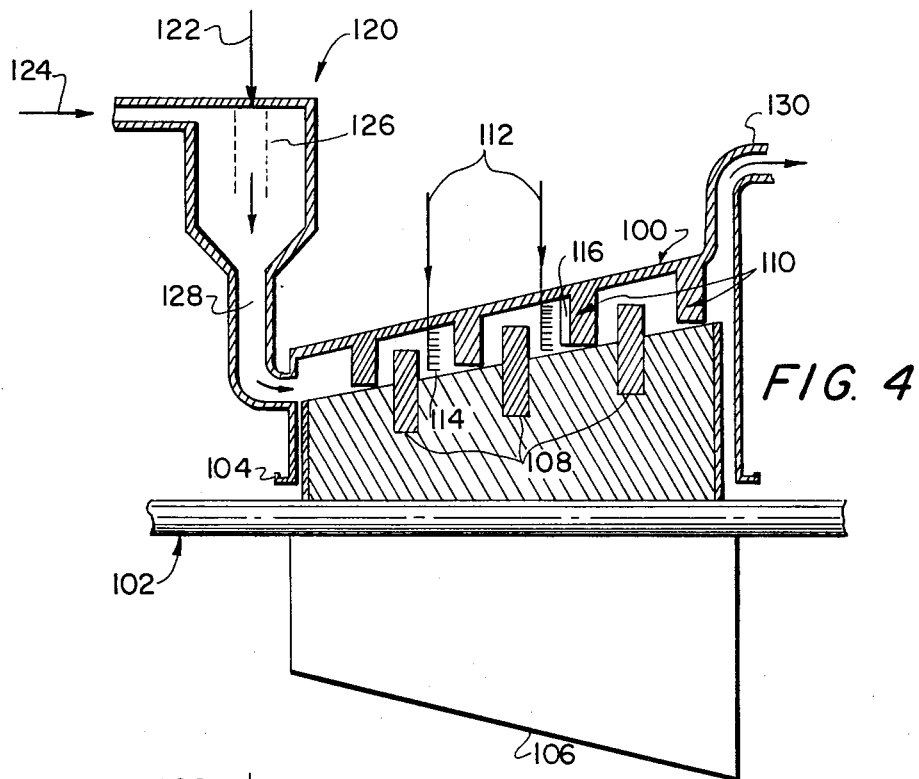
FIG. 4 is a schematic drawing in partial section showing in detail the structure of one embodiment of a combustor-turbine constructed in accordance with the present invention.

Now referring to FIG. 4, reference numeral 100 designates a combustor-turbine constructed in accordance with the present invention and adapted to add fuel through the casing of the machine. Combustor-turbine 100 includes a rotating shaft 102 having a seal 104, an outer casing 106, a plurality of rotating blades 108 adapted to deliver power to shaft 102 and attached to the shaft assembly in any suitable manner, and a plurality of stationary vanes 110 to adjust kinetic energy. Combustor-turbine 100 is provided with a plurality of fuel inlets 112 which pass through casing 106 and are equipped with a plurality of fuel nozzles 114.

Combustor-turbine 100 also includes a catalytic device 116 adapted to assist or improve the combustion of the fuel therein. Catalytic device 116 may be designed in the form of a honeycomb, mesh, multiple pipes, etc., (or provide catalyst as coating on external parts of the turbine, especially on the fixed vanes 110 with the catalyst disposed on a metallic support, ceramic, silicon carbide or nitride, etc.). Combustion catalysts useful in the present invention are well known, such as, for example: iron, nickel, molybdenum, palladium, copper, zinc, manganese, or similar elements within each of these periodic groups, or thorium and other rare earth catalysts, as well as combinations and mixtures of any of these. Iron compound such as oxides disposed on metallic support, or a support such as zirconia, alumina, or silica can be used. Precious metals such as platinum, palladium, etc. can be used, and rhenium, ruthenium, etc. may also be added. Various commercially available catalysts are used in catalytic incineration and other combustion operations and can be used as desired.

Combustor-turbine 100 is provided with a conventional combustor 120 which raises the temperature of the inlet gases to the desired level by burning a fuel introduced into the combustor 120 through fuel inlet conduit 122. Air is introduced into combustor 120 through air inlet conduit 124 and combustion is facilitated in combustor 120 by means of baffles 126 (or equivalent mixing means). The preheated gases leave combustor 120 and pass through conduit 128 into combustor-turbine 100. The exhaust gas from combustor-turbine 100 leaves via conduit conduit 130.

Figure 5:
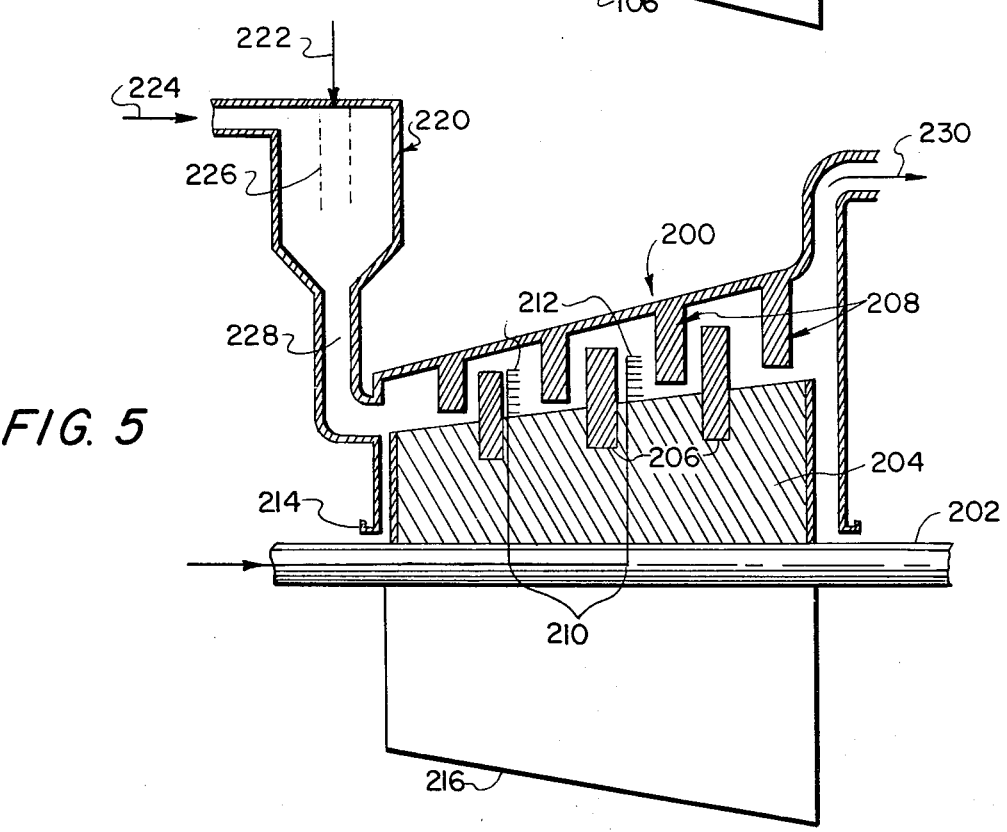
FIG. 5 is a schematic drawing in partial section showing in detail the structure of a second embodiment of a combustor-turbine constructed in accordance with the present invention.

Another embodiment of a combustor-turbine of the present invention is shown in FIG. 5, being designated as combustor-turbine 200, and is adapted to add fuel thereto by use of a hollow shaft 202 and from the rotor assembly 204. Combustor-turbine 200 is provided with a plurality of rotating blades 206 attached to the rotor assembly 204 and a plurality of stationary blades or vanes 208.

As referred to above, fuel is introduced into combustor-turbine 200 through hollow shaft 202 from which it passes through conduits 210 which are each provided with a plurality of spray nozzles 212. Combustor-turbine 202 is provided with a seal 214 for shaft 202 and an outer casing 216.

Combustor-turbine 200 is provided with a conventional combustor 220 which raises the temperature of the inlet gases to the desired level by burning a fuel introduced into the combustor 220 through fuel inlet conduit 222. Air is introduced into combustor 222 through air inlet conduit 224 and combustion is facilitated in combustor 220 by means of baffles 226 (or equivalent mixing means). The preheated gases leave combustor 220 and pass through conduit 228 into combustor-turbine 200. The exhaust gas from combustor-turbine 200 leaves via conduit 230.

While the invention has been described with reference to specific embodiments, it will be obvious to those skilled in the art that modifications and variations of the invention may be constructed without departing from the spirit and scope of the invention. The scope of the invention is defined in the following claims.

What is claimed is:

1. In a method of producing power in a gas turbine, the improvement which comprises injecting and combusting a fuel with air in the presence of a combustion catalyst in said gas turbine.

2. In a system for producing power including a gas turbine, the improvement which comprises providing combustion means for injecting and firing a fuel into said turbine and means for providing a catalyst in said gas turbine to improve the combustion of said fuel.

3. In a method of producing power in a gas turbine, the improvement which comprises injecting and combusting a fuel with air in the presence of a combustion catalyst in said gas turbine to thereby maintain the expansion of said gas at substantially isothermal conditions.

4. A method according to claim 3 wherein said combustion is carried out by injecting said fuel in increments at two or more points in said turbine.

5. A method according to claim 3 wherein the fuel injected into said turbine is a liquid fuel and contains at least about 2% water to thereby aid in the atomization of said fuel in said turbine.

6. A method according to claim 3 wherein the temperature is greater than about 1000° F. and the pressure is greater than about 10 atmospheres.

7. A method according to claim 3 wherein said air is compressed prior to feeding it to said turbine.

8. A method according to claim 7 wherein said compressed air is indirectly heat exchanged with the exhaust gas from said gas turbine.

9. In a system for producing power including a gas turbine, the improvement which comprises providing combustion means for injecting and firing a fuel into said turbine to thereby maintain the expansion of the gas at substantially isothermal conditions and means for providing a catalyst in said gas turbine to improve the combustion of said fuel.

10. A power system according to claim 9 wherein said combustion means includes fuel injection means for injecting fuel in increments at two or more points.

11. A power system according to claim 9 including a combustion means for injecting and firing fuel in said air to thereby heat said air prior to passing it into said gas turbine.

12. A power system according to claim 9 including a compression means for compressing air to be fed to the said gas turbine.

13. A power system according to claim 12 including indirect heat exchange means for heating said compressed air with the exhaust gas from said gas turbine.

* * * * *